No. 768,957. PATENTED AUG. 30, 1904.
H. C. SNOOK.
ELECTRICAL MEASURING INSTRUMENT.
APPLICATION FILED JUNE 17, 1904.
NO MODEL.
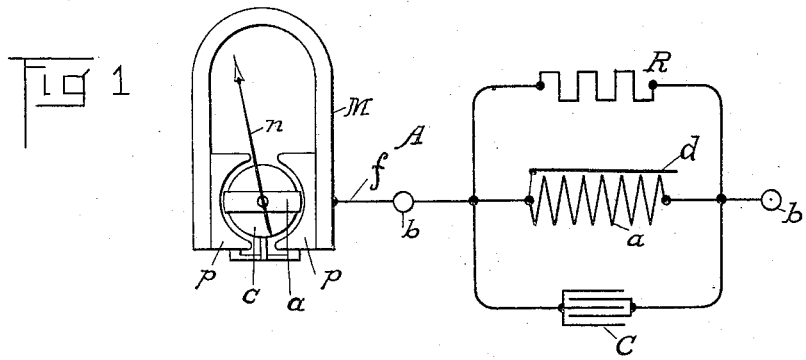
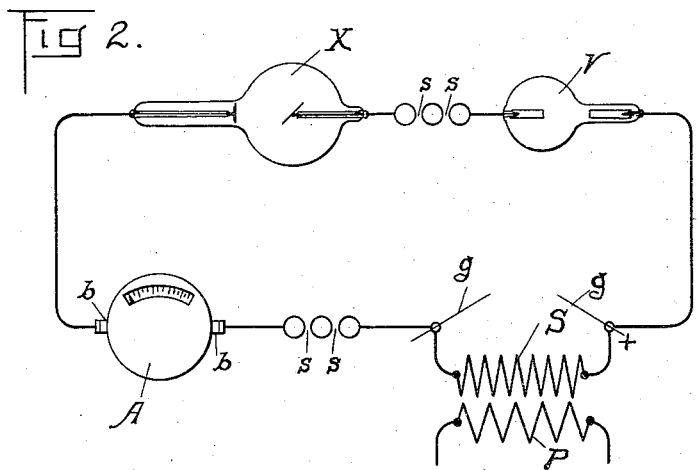
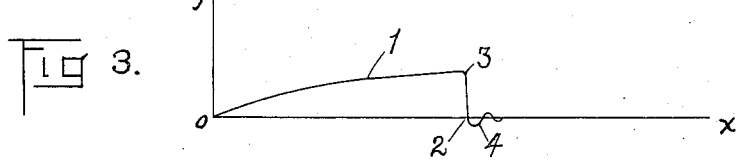
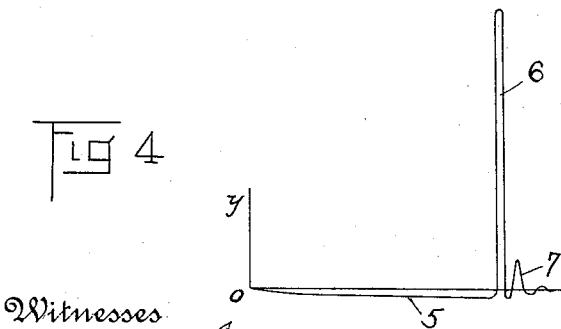
Witnesses
James M. Sawyer
Wm Hamilton
Inventor
Homer Clyde Snook
by Cornelius D. Ehret
his Attorney No. 768,957. Patented August 30, 1904.

UNITED STATES PATENT OFFICE.

HOMER CLYDE SNOOK, OF PHILADELPHIA, PENNSYLVANIA, ASSIGNOR TO ROENTGEN MANUFACTURING COMPANY, OF PHILADELPHIA, PENNSYLVANIA, A CORPORATION OF PENNSYLVANIA.

ELECTRICAL MEASURING INSTRUMENT.

SPECIFICATION forming part of Letters Patent No. 768,957, dated August 30, 1904.

Application filed June 17, 1904. Serial No. 212,934. (No model.)

*To all whom it may concern:*

Be it known that I, HOMER CLYDE SNOOK, residing at Philadelphia, in the city and county of Philadelphia and State of Pennsylvania, have invented a new and useful Electrical Measuring Instrument, of which the following is a specification.

My invention relates to electrical measuring instruments, and more especially to an instrument adapted to be used with high-potential circuits or circuits traversed by relatively short impulses of current, such impulses succeeding each other at relatively great intervals of time.

My invention comprises a combination of means whereby the measurement of electrical quantities may be made in connection with circuits over which pass high-potential impulses, and more particularly unidirectional impulses.

In one of its aspects my invention comprises an electrical measuring instrument for use with circuits over which pass currents derived from the secondaries of induction or Ruhmkorff coils or the like.

Reference is to be had to the accompanying drawings, which illustrate one embodiment of my invention, an ammeter for the measurement of currents passed through an X-ray or similar tube being shown.

In said drawings, Figure 1 is a view, partly diagrammatic, of the measuring instrument. Fig. 2 is a diagrammatic view of circuits and apparatus illustrating my invention. Fig. 3 is a graphic representation of a current impulse in the primary of the induction-coil. Fig. 4 is a graphic representation of the current resulting in the secondary.

Referring to Fig. 1, M represents a permanent magnet having the pole-pieces $p$ $p$, whose inner surfaces are portions of the same cylinder. Secured to the pole-pieces and supported concentrically with the inner polar surfaces is the internal magnetic core $c$. In the narrow annular space between the inner polar surfaces and the core $c$ is mounted the coil $a$, which rotates within the magnetic field when current passes through its winding. The coil $a$ carries the indicator or pointer $n$, which moves over a graduated scale or dial, thus indicating magnitudes of electrical quantities.

The mechanism as thus far described is known in the art as a "Deprez-D'Arsonval" galvanometer. In instruments of this kind the movable coil $a$ is wound upon a frame of copper or aluminium, either sheet or wire, which serves as a damping means to render the instrument dead-beat, the coil and frame being delicately mounted on pivots bearing in jewels, the current being led into and out of the winding of the coil by means of flat spiral springs connected at their inner ends to the coil-pivots and at their outer end to abutments. Such instrument has heretofore been used for measuring continuous currents as distinguished from unidirectional impulses following each other at relatively great time intervals. Furthermore, such instruments have heretofore been capable of use on circuits of low or moderately high potentials only. By the means hereinafter described, however, I have been able to transform such instrument of the prior art into one capable of measuring unidirectional impulses which succeed each other at relatively great time intervals and in connection with circuits of high or very high potentials, such as derived from induction-coils or Ruhmkorff coils capable of giving sparks through air having a length of from several inches up to thirty or more inches, representing voltages or potentials as high as several hundreds of thousands of volts. This transformation of the instrument of the prior art into the instrument herein claimed results from several innovations and features, without which the instrument of the prior art would be useless and would, in fact, be destroyed or burned out if it were attempted to use such instrument to measure high-potential impulses.

The right-hand portion of Fig. 1 illustrates diagrammatically the movable coil $a$ in shunt, to which is connected the condenser C and the resistance R, comprised of highly-insulated conductor non-inductively wound. The resistance-bobbins, wound non-inductively, as commonly used in the low-potential electrical measuring instruments, will not serve for the resistance R of the instrument herein described. It is necessary to especially wind the resistance R in a manner insuring great insulation between the neighboring parts of the wire. If wound as heretofore practiced in low-potential instruments, sparking will occur between neighboring convolutions or layers, with the result that a substantial error will be introduced into the reading of the instrument. $b\ b$ are the binding-posts of the instrument. One terminal of the movable coil $a$ is connected electrically with the magnet M, and therefore also with the internal core $c$, by means of the conductor $f$. When the instrument is mounted within a metallic casing, electrical connection is also made from the same terminal of the coil $a$ with such casing. Similarly, an electrical connection is made between the same terminal of the coil $a$ and the copper or aluminium damping-frame, (represented diagrammatically by $d$ in Fig. 1.) The electrical connection between the damping-frame and one terminal of the coil $a$ is not essential as long as a condenser C is connected in shunt to the coil $a$. The conductor $f$, which connects one terminal of the coil $a$ with all the juxtaposed metallic or conducting parts, including magnet M, core $c$, and the casing of the instrument, is a means whereby the electrostatic potential of the coil $a$ is maintained the same as that of all neighboring parts. In other words, by thus connecting one terminal of the coil $a$ with the juxtaposed conducting parts, such as magnet and casing, such juxtaposed parts rise to the high potential with the coil $a$, and in consequence there will be no sparking from the body of the coil $a$ to the surrounding parts. Such sparking would ruin the instrument and make it useless for measuring high-potential impulses. The condenser C serves also to prevent sparking between neighboring convolutions of the coil $a$ and to operate as a hold-over device or reservoir, whereby current through the coil $a$ persists for a longer time than the impulse which traverses the circuit.

Referring to Fig. 3, the portion 1 of the curve therein shown represents the rise of a direct current in the primary of an induction-coil. Distances along the axis $o\ y$ represent current magnitudes, and distances along the axis $o\ x$ represent times. Due to the self-induction of the primary of the induction-coil the current does not gain its full value instantly, but rather after a considerable time, (represented approximately by $o^2$.) At 3 the current is broken at the interrupter in the primary circuit and falls suddenly to zero value, and then occur several small oscillations, as 4, probably due to the condenser in shunt to the interrupter. The result in the secondary circuit is graphically represented in Fig. 4. The small inverse current due to the rise of current of primary may be represented by the portion 5. When the current breaks in the primary, there is a sudden direct impulse 6 of great amplitude, but very short duration. This impulse is followed by several impulses 7, corresponding to the short primary impulses 4. It is these impulses 6 which are used in X-ray and similar work, and it is these impulses which may be measured by the instrument illustrated in Fig. 1. The condenser C is charged by each impulse 6, a portion of such impulse flowing simultaneously through the resistance R, the coil $a$ being traversed by a current dependent upon the difference of potential across the terminals of the resistance R. After the impulse has passed and before the succeeding impulse the condenser C discharges through R and $a$, the effect being to prolong the period of time during which current is flowing through the coil $a$.

The condenser C may be replaced by some other condenser-like device, such as an electrolytic device or small storage-cell. However, a mica condenser is preferred.

Referring to Fig. 2, P represents the primary of an induction or Ruhmkorff coil, whose secondary is represented at S. $g\ g$ represent terminals of the usual spark-gap. In circuit with the secondary S are included in series with each other the several small spark-gaps $s\ s$, the ventral-tube V, the X-ray tube X, and the instrument A, as shown in Fig. 1. The ventral-tube V serves to suppress all impulses in the secondary circuit except the direct impulses, such as 6. The inverse impulses 5 are to a greater or less extent suppressed by the ventral-tube V, such tube being in the nature of an asymmetrical resistance and may be replaced by any device offering greater resistance to a current flowing in a given direction than it offers to a current flowing in the opposite direction. The spark-gaps $s\ s$ serve also to suppress the inverse impulses, as 5, and weak impulses, as 7, because the potential of such impulses is too small to cause a spark to leap across such gaps, while the impulses 6 are of exceedingly high potential and easily leap such gaps. The ammeter is connected intermediate the X-ray tube X and the negative terminal of the secondary S as its preferred position, for when connected between the positive terminal of the secondary S and the tube X sufficient static charge will collect on the conductors intermediate such positive terminal and the remainder of the circuit to cause a slight indication to be registered by the needle $n$, even though no current is passing through the tube X. It follows that in the circuit of the secondary S only unidirectional impulses of high potential pass. These the instrument A measures, the indications serving to inform the operator as to the intensity or quantity of X-rays emitted, as well as to inform him of the condition or degree of vacuum in the tube X.

From the foregoing description it is seen that a direct-reading electrical measuring instrument is provided, and which operates on the magnetic principle as distinguished from the hot-wire or electrostatic instruments, which have features of serious disadvantage.

It is apparent that the instrument herein described is portable and occupies no more space than the present continuous-current low-potential instruments.

It is to be understood that the instrument and circuits described herein may be used also in connection with induction or Ruhmkorff coils, whose primary windings are supplied by fluctuating or alternating currents, as well as by continuous currents. It is to be understood also that my invention is not limited to an instrument having a permanent magnet, but that it is equally applicable to an instrument having an electromagnet for producing or maintaining the magnetic field, and that it is applicable as well to an electrodynamometer instrument, in which case the condenser C may be connected in shunt to the movable coil, the fixed coil, or to both the fixed and movable coils. My invention is applicable also to instruments in which the winding is a stationary one, the movable part being a magnetic vane, needle, or the like. In such case also the condenser C will be connected in shunt to such stationary winding, and in all cases the winding and parts traversed by the impulses or which are in electrical communication with the high-potential circuit will be electrically connected to all juxtaposed conducting parts. It is to be understood also that the resistance R may be omitted in some cases and a relatively great resistance connected in series with the coil $a$. In the alternate forms of instruments above mentioned the resistance R may be connected in parallel with the winding or coil, or a relatively great resistance may be connected in series with such winding or coil. It is to be understood also that in addition to resistance R of the instrument shown in Fig. 1 or of the alternate types of instruments a resistance may be connected in series with the winding or coil $a$.

What I claim is—

1. In combination, means for producing a magnetic field, a winding associated with said means, means for maintaining said winding at the same potential with juxtaposed parts, a condenser in shunt to said winding, and means for indicating the extent of reaction between said magnetic field and the field produced by a current passed through said winding.

2. In combination, means for producing a magnetic field, a winding associated with said means, means for maintaining said winding at the same potential with juxtaposed parts, and means for indicating the extent of reaction between said magnetic field and the field produced by a current passed through said winding.

3. In combination, means for producing a magnetic field, a winding associated with said field, means for maintaining said winding and said field-producing means at the same potential, a resistance in shunt to said winding, and means for indicating the extent of reaction between said magnetic field and the field produced by current passed through said winding.

4. In combination, means for producing magnetic field, a winding associated with said field, means for maintaining said winding and said field-producing means at the same potential, a condenser in shunt with said winding, a resistance in shunt with said winding, and means for indicating the extent of reaction between said magnetic field and the field produced by current passed through said winding.

5. In combination, means for producing a magnetic field, a winding associated with said means, means for maintaining said winding at the same potential with juxtaposed parts, and means for indicating the extent of reaction between said magnetic field and the field produced by a current passed through said winding.

6. In combination in an instrument for measuring high-potential impulses, means for producing a magnetic field, a winding associated with said means, means for maintaining said winding at the same potential with juxtaposed parts, means for prolonging the impulses in said winding, and means for indicating the extent of reaction between said magnetic field and the field produced by said impulses passed through said winding.

7. In combination in an instrument for measuring high-potential impulses, means for producing a magnetic field, a winding associated with said means, means for maintaining said winding at the same potential with juxtaposed parts, a non-inductive resistance in shunt to said winding, means for prolonging the impulses through said winding, and means for indicating the extent of reaction between said magnetic field and the field produced by said impulses passed through said winding.

8. In combination, in an instrument for measuring high-potential impulses, a permanent magnet, a winding associated therewith, means for maintaining said winding at the same potential with juxtaposed parts, and means for indicating the extent of reaction bewween the field of said permanent magnet and the field produced by impulses passed through said winding.

9. In combination in an instrument for measuring electrical impulses, a permanent magnet, a winding associated therewith, a condenser in shunt to said winding, and means for indicating the extent of reaction between the field of said permanent magnet and the field produced by impulses passed through said winding.

10. In combination in an instrument for measuring high-potential impulses, a permanent magnet, a winding associated therewith, means for maintaining said winding at the same potential with juxtaposed parts, a condenser in shunt to said winding, and means for indicating the extent of reaction between the field of said permanent magnet and the field produced by the impulses passed through said winding.

11. In combination in an instrument for measuring electrical impulses, a permanent magnet, a winding associated therewith, a condenser in shunt to said winding, a non-inductive resistance in shunt to said winding, and means for indicating the extent of reaction between the field of said permanent magnet and the field produced by the impulses passed through said winding.

12. In combination in an instrument for measuring high-potential impulses, a permanent magnet, a winding associated therewith, means for maintaining said winding at the same potential with juxtaposed parts, a non-inductive resistance in shunt to said winding, a condenser in shunt to said winding, and means for indicating the extent of reaction between the field of said permanent magnet and the field produced by impulses passed through said winding.

13. In combination in an instrument for measuring high-potential impulses, a permanent magnet, a coil rotatable in the field of said magnet, means for maintaining said coil at the same potential with juxtaposed parts, and means for indicating the extent of movement of said coil under the influence of impulses passed therethrough.

14. In combination in an instrument for measuring electrical impulses, a permanent magnet, a coil adapted to rotate in the field of said magnet, a condenser in shunt to said coil, and means for indicating the extent of movement of said coil under the influence of impulses passed therethrough.

15. In combination in an instrument for measuring high-potential impulses, a permanent magnet, a coil rotatable in the field of said magnet, means for maintaining said coil at the same potential with juxtaposed parts, a condenser in shunt to said coil, and means for indicating the extent of movement of said coil under the influence of impulses passed therethrough.

16. In combination in an instrument for measuring high-potential impulses, a permanent magnet, a coil adapted to rotate in the field of said magnet, means for maintaining said coil at the same potential with juxtaposed parts, a non-inductive resistance in shunt to said coil, and means for indicating the extent of movement of said coil under the influence of impulses passed therethrough.

17. In combination in an instrument for measuring high-potential impulses, a permanent magnet, a coil rotatable in the field of said magnet, means for maintaining said coil at the same potential with juxtaposed parts, non-inductive resistance in shunt to said coil, a condenser in shunt to said coil, and means for indicating the extent of movement of said coil under the influence of impulses passed therethrough.

18. In combination in an instrument for measuring electrical impulses, a permanent magnet, a coil adapted to rotate in the field of said magnet, a resistance in shunt to said coil, a condenser in shunt to said coil, and means for indicating the extent of movement of said coil under the influence of impulses passed therethrough.

19. In combination in an instrument for measuring high-potential impulses, a permanent magnet, a coil adapted to rotate in the field of said magnet, means for maintaining coil at the same potential with juxtaposed parts, a condenser in shunt to said coil, a resistance in shunt to said coil, and means for indicating the extent of movement of said coil under the influence of impulses passed therethrough.

20. In combination in an instrument for measuring electrical impulses, means for producing a magnetic field, a coil rotatable in said field, means for damping said coil, means for maintaining said coil and damping means at the same potential, a condenser in shunt to said coil, and means for indicating the extent of movement of said coil under the influence of impulses passed therethrough.

21. In combination in an instrument for measuring high-potential impulses, means for producing a magnetic field, a coil rotatable in said field, means for maintaining said coil at the same potential with juxtaposed parts, a condenser in shunt to said coil, and means for indicating the extent of movement of said coil under the influence of impulses passed therethrough.

22. In combination in an instrument for measuring high-potential impulses, means for producing a magnetic field, a winding associated with said field, means for maintaining said winding at the same potential with juxtaposed parts, a condenser in shunt to said winding, and means for indicating the extent of reaction between said magnetic field and the field produced by impulses passed through said winding.

23. In combination in an instrument for measuring high-potential impulses, means for producing a magnetic field, a winding associated with said means, means for maintaining said winding at the same potential with juxtaposed parts, a resistance comprising a highly-insulated conductor non-inductively wound, and means for indicating the extent of reaction between said magnetic field and the field produced by impulses passed through said winding.

24. In combination, a source of high-potential impulses, a translating device supplied thereby, a winding connected with the circuit of said translating device, means associated with said winding for producing a magnetic field, means for maintaining said winding at the same potential with juxtaposed parts, and means for indicating the extent of reaction between said magnetic field and the field produced by the impulses passed through said winding.

25. In combination, a source of high-potential impulses, a translating device supplied thereby, a winding connected with the circuit of said translating device, means associated with said winding for producing a magnetic field, means for maintaining said winding at the same potential with juxtaposed parts, a condenser in shunt to said winding, and means for indicating the extent of reaction between said magnetic field and the field produced by the impulses passed through said winding.

26. In combination, a source of high-potential impulses, a translating device supplied thereby, a coil connected with the circuit of said translating device, a permanent magnet in whose field said coil is rotatable, means for maintaining said coil at the same potential with juxtaposed parts, a condenser in shunt to said coil, and means for indicating the extent of movement of said coil under the influence of impulses passed therethrough.

27. In combination, a circuit, a translating device connected with said circuit, a source of positive and negative impulses connected with said circuit, means for preventing the passage through said circuit of other than unidirectional impulses, a coil connected with said circuit, a permanent magnet in whose field said coil is rotatable, a condenser in shunt to said coil, and means for indicating the extent of movement of said coil under the influence of impulses passed therethrough.

28. In combination, a circuit, a secondary of an induction-coil connected therewith, means connected with said circuit for preventing the passage of other than unidirectional impulses, an X-ray tube connected with said circuit, a coil connected with said circuit, a permanent magnet in whose field said coil is rotatable, means for maintaining said coil at the same potential with juxtaposed parts, a condenser in shunt to said coil, and means for indicating the extent of movement of said coil under the influence of impulses passed therethrough.

29. In combination, a circuit, the secondary of an induction-coil connected therewith, an X-ray tube connected with said circuit, a spark-gap in said circuit between said secondary and said X-ray tube, means in said circuit for preventing a coil connected with said circuit, a permanent magnet in whose field said coil is rotatable, means for maintaining said coil at the same potential with juxtaposed parts, a condenser in shunt to said coil, and means for indicating the extent of movement of said coil under the influence of impulses passed therethrough.

30. In combination, a circuit, the secondary of an induction-coil connected therewith, an X-ray tube connected in said circuit, an electrical measuring instrument connected in said circuit, means for maintaining the winding of said instrument at the same potential with juxtaposed parts, and a condenser in shunt to said winding.

HOMER CLYDE SNOOK.

Witnesses:
JOHN CONNELL,
F. M. BRYAN.